Patented Jan. 29, 1935

1,989,565

UNITED STATES PATENT OFFICE 1,989,565

PREPARATION OF STABLE SUPERSATURATED SOLUTIONS OF CALCIUM GLUCONATE

Arthur Stoll and Ernst Burckhardt, Basel, Switzerland, assignors to the firm Chemical Works formerly Sandoz, Basel, Switzerland No Drawing. Application March 13, 1931, Serial No. 522,520. In Germany March 21, 1930

2 Claims. (Cl. 167—68)

This invention relates to an improved process for the preparation of stable supersaturated solutions of calcium gluconate.

In the U. S. Patents 1,865,141 and 1,904,257, processes for the preparation of stable solutions containing pure calcium gluconate or mixtures thereof with other substances are described.

It has now been found that by an addition of relative small quantities of calcium mannonate to supersaturated solutions of calcium gluconate it becomes possible to considerably slow down the crystallization thereof. This is in so far very astonishing as the solubility of calcium gluconate in the solutions of calcium mannonate is only very little increased, as it can be shown by the following tests.

By shaking during some hours calcium gluconate with water at 15° C., the same is dissolved therein only to about 3%, and by shaking it with a 3% aqueous calcium mannonate solution at the same temperature, only about 3.5% of calcium gluconate become dissolved. Both salts are, therefore, present in a solution prepared in this way in a proportion of 1:1. As it has now been found by adding to a warm solution containing e. g. 10% of calcium gluconate a fifth by weight of this substance of calcium mannonate, a solution is obtained, which on cooling down remains in a closed vessel a very long time perfectly clear and without any precipitation occurs. Even after addition of crystals of calcium gluconate to such cold solutions only a very small crystallization takes place which amount after several days is only a minimum fraction of the substance in solution, contrarily to a solution containing 10% of pure calcium gluconate which after addition of small crystals is transformed within about 30 hours into a thick pap of crystals. Somewhat higher additions of calcium mannonate to 10% of solutions of calcium gluconate prevent completely the crystallization of the latter, even after addition of dry pulverized calcium gluconate.

The present invention is of a very great technical value as it allows to prevent the crystallization from its supersaturated solutions of calcium gluconate by means of a substance that it very closely parent and physiologically equivalent to calcium gluconate and which in the dilution used can be injected together with the great surplus of calcium gluconate without producing any irritation of the tissues.

The addition of calcium mannonate in order to prevent the crystallization of calcium gluconate is especially indicated in cases where irregularities of the walls of the containers or fluctuations of the temperature or violent shocks on the containers during the transport stimulate the crystallization of pure supersaturated calcium gluconate solutions.

The following examples, without being limitative, illustrate the present process, the parts being by weight.

Example 1

To a solution of 800 parts of pure calcium gluconate in 10,000 parts of hot water are added 200 parts of calcium mannonate. The solution thus obtained is then filtered and introduced in hot state into suitable containers which are then closed and stored. In order to destroy the eventually present centers of crystallization the closed containers are preferably heated at intervals for a certain time at a temperature of about 90° C. and allowed to cool down again. The supersaturated solutions thus obtained remain perfectly clear on storage.

Example 2

2 parts of calcium gluconate are dissolved in 10 parts of hot water and 0.3 parts of calcium mannonate are added thereto. The hot solution thus obtained is filtered and introduced into suitable containers, e. g. ampoules, which after being closed are heated several times to 90–100° C. The solution thus obtained which contains 20% of calcium gluconate is perfectly stable.

What we claim is:—

1. A process for improving the stability of supersaturated aqueous calcium gluconate solutions, prepared by heating in closed vessels hot concentrated solutions of calcium gluconate, characterized in that to such solutions are added smaller amounts of calcium mannonate as compared to the quantity of calcium gluconate dissolved therein.

2. As new composition of matter, clear, stable, sterile and supersaturated aqueous calcium gluconate solutions, containing 4–20% of calcium gluconate and 1–3% of calcium mannonate, which do not crystallize, even during long storage and which possess excellent therapeutical properties and are capable of being used for intramuscular injections free from irritating of the tissues.

ARTHUR STOLL.
ERNST BURCKHARDT.